United States Patent
Washizu

(10) Patent No.: US 10,259,895 B2
(45) Date of Patent: Apr. 16, 2019

(54) PREPARATION PROCESS OF BRANCHED CONJUGATED DIENE POLYMER

(71) Applicant: SUMITOMO RUBBER INDUSTRIES, LTD., Kobe-shi (JP)

(72) Inventor: Kensuke Washizu, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/378,186

(22) PCT Filed: Jan. 22, 2013

(86) PCT No.: PCT/JP2013/051190
§ 371 (c)(1),
(2) Date: Aug. 12, 2014

(87) PCT Pub. No.: WO2013/128977
PCT Pub. Date: Sep. 6, 2013

(65) Prior Publication Data
US 2015/0038657 A1    Feb. 5, 2015

(30) Foreign Application Priority Data
Mar. 1, 2012    (JP) .................... 2012-045819

(51) Int. Cl.
| | | |
|---|---|---|
| C08F 236/22 | (2006.01) | |
| C08F 236/08 | (2006.01) | |
| C08F 236/06 | (2006.01) | |
| C08F 36/22 | (2006.01) | |
| C08L 9/00 | (2006.01) | |
| C08L 9/06 | (2006.01) | |
| C08L 47/00 | (2006.01) | |
| B60C 1/00 | (2006.01) | |
| C08F 12/08 | (2006.01) | |

(52) U.S. Cl.
CPC ............ C08F 36/22 (2013.01); B60C 1/0016 (2013.01); C08F 12/08 (2013.01); C08F 236/22 (2013.01); C08L 9/00 (2013.01); C08L 9/06 (2013.01); C08L 47/00 (2013.01)

(58) Field of Classification Search
CPC ........ C08F 32/22; C08F 136/22; C08F 236/22
See application file for complete search history.

(56) References Cited

U.S. PATENT DOCUMENTS

| | | | | |
|---|---|---|---|---|
| 2,487,898 A | * | 11/1949 | Rummelsburg | ............... 526/238 |
| 2,829,065 A | * | 4/1958 | Gleason et al. | ................ 585/12 |
| 3,478,005 A | * | 11/1969 | Wheeler | ........................ 526/281 |
| 3,484,333 A | * | 12/1969 | Vanderbilt | .............. B29C 70/10 |
| | | | | 156/329 |
| 4,330,649 A | | 5/1982 | Kioka et al. | |
| 4,401,589 A | | 8/1983 | Kioka et al. | |
| 5,187,236 A | | 2/1993 | Coolbaugh et al. | |

(Continued)

FOREIGN PATENT DOCUMENTS

| | | |
|---|---|---|
| CN | 1055369 A | 10/1991 |
| JP | 63 179908 | 7/1988 |

(Continued)

OTHER PUBLICATIONS

Newmark (13C-NMR Spectra of cis-Polymyrcene and cis-Polyfarnesene. Journal of Polymer Science: Part A: Polymer Chemistry, 1988, 26, 71-77).*

(Continued)

*Primary Examiner* — Brieann R Johnston
(74) *Attorney, Agent, or Firm* — Oblon, McClelland, Maier & Neustadt, L.L.P.

(57) ABSTRACT

There is provided a process for preparing a branched conjugated diene polymer by copolymerizing 1 to 100% by weight of a branched conjugated diene compound (1) monomer:

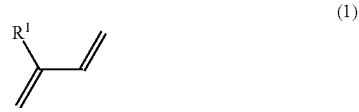

wherein $R^1$ is an aliphatic hydrocarbon having 6 to 11 carbon atoms, with 99 to 0% by weight of a conjugated diene compound (2) monomer:

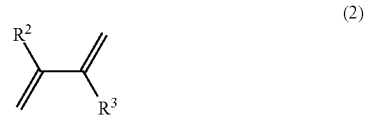

wherein $R^2$ and $R^3$ are the same or different and each is a hydrogen atom, or the like, and/or 99 to 0% by weight of a vinyl compound (3) monomer:

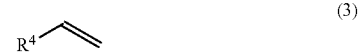

wherein $R^4$ is an aliphatic hydrocarbon group having 6 to 10 carbon atoms, or the like,
wherein the process comprises a step of polymerizing by adding a monomer solution successively into a catalyst solution. The branched conjugated diene polymer is useful as a rubber component for a tire for improving processability.

20 Claims, No Drawings

(56) References Cited

U.S. PATENT DOCUMENTS

| | | |
|---|---|---|
| 7,759,444 B1 | 7/2010 | McPhee |
| 7,868,114 B1* | 1/2011 | McPhee .................... 526/340.3 |
| 2003/0157344 A1* | 8/2003 | Shoup ..................... C08J 7/04 |
| | | 428/447 |
| 2007/0179260 A1 | 8/2007 | Hou et al. |
| 2010/0056714 A1* | 3/2010 | McPhee ................. C08C 19/02 |
| | | 524/579 |
| 2010/0056743 A1 | 3/2010 | McPhee |
| 2010/0331511 A1 | 12/2010 | McPhee |
| 2011/0040058 A1* | 2/2011 | McAuliffe et al. ........... 526/337 |
| 2014/0100316 A1 | 4/2014 | Washizu |
| 2014/0200321 A1 | 7/2014 | Washizu |

FOREIGN PATENT DOCUMENTS

| | | |
|---|---|---|
| JP | 63 54004 | 10/1988 |
| JP | 6 93059 | 4/1994 |
| JP | 2007-246917 A | 9/2007 |
| JP | 2008 156516 | 7/2008 |
| JP | 2010-077253 A | 4/2010 |
| JP | 2012-502135 A | 1/2012 |
| WO | 2005 085306 | 9/2005 |
| WO | WO 2008/047399 A1 | 4/2008 |
| WO | 2010 027463 | 3/2010 |
| WO | 2010 027464 | 3/2010 |
| WO | WO 2013/151068 A1 | 10/2013 |

OTHER PUBLICATIONS

Sivola (The n-butyllithium-initiated polymerization of myrcene and its copolymerization with styrene. Acta Polytechnica Scandinavica Chemistry including Metallurgy Series. Chapter 134. 1977. 65 pages).*
Hwa (Polymerization of Myrcene by Metal Alkyl Corrdination Catalysts. 1960, PhD dissertation, University of Illinois.).*
Pirrung (Chapter 4.3: Apparatus for Addition. The Synthetic Organic Chemist's Companion. 2007, pp. 36-40).*
U.S. Appl. No. 14/368,407, filed Jun. 24, 2014, Washizu.
U.S. Appl. No. 14/370,323, filed Jul. 2, 2014, Washizu.
U.S. Appl. No. 14/217,814, filed Mar. 18, 2014, US2014/0200321 A1, Washizu.
U.S. Appl. No. 14/017,382, filed Sep. 4, 2013, US2014/0100316 A1, Washizu.
U.S. Appl. No. 14/378,193, filed Aug. 12, 2014, Washizu.
International Search Report dated Mar. 19, 2013 in PCT/JP13/051190 Filed Jan. 22, 2013.
Chinese Office Action dated Sep. 28, 2015, in Chinese Patent Application No. 201380009866.2 (with English Translation).
Japanese Office Action dated Jul. 12, 2016, in Japanese Patent Application No. 2014-502066 (with English Translation).

* cited by examiner

PREPARATION PROCESS OF BRANCHED CONJUGATED DIENE POLYMER

TECHNICAL FIELD

The present invention relates to a process for preparing a branched conjugated diene polymer, particularly a process for preparing a branched conjugated diene homopolymer and a branched conjugated diene copolymer.

BACKGROUND ART

So far in a polymerization reaction of a conjugated diene polymer and a conjugated diene copolymer prepared by solution polymerization, there was a problem that heat of the reaction increases as catalyst is added to monomer solution, thereby increasing a reaction temperature, and in particular, if the reaction temperature exceeds a boiling point of the monomers, boiling starts abruptly, which is dangerous. Particularly, the case of preparing a liquid polymer using a large amount of catalyst is so much the worst.

In order to cope with such a problem, in conventional solution polymerization reaction, a pressure resistant reaction vessel has been used from safety point of view. Further, as countermeasures to be taken in view of safety, not only use of a pressure resistant reaction vessel but also use of pressure resistant equipment for transferring materials which withstands an inner pressure or cooling equipment for controlling the reaction temperature was required, which lead to a problem that equipment cost increases. Furthermore, in order to inhibit abrupt generation of heat of reaction, it was necessary to limit an amount of catalyst to be used.

Myrcene is a natural organic compound and is a kind of olefin belonging to monoterpene. There are two kinds of isomers as myrcene such as α-myrcene (2-methyl-6-methyleneocta-1,7-diene) and β-myrcene (7-methyl-3-methyleneocta-1,6-diene), and when simply referring to myrcene, it usually indicates the latter one. In Patent Document 1, a polymer of myrcene is disclosed.

Farnesene is a kind of isoprenoid compound synthesized chemically by oligomerization of isoprene or dehydration reaction of nerolidol, and is used mainly as a perfume or its starting material (Patent Document 2).

PRIOR ART DOCUMENTS

Patent Documents

Patent Document 1: JP 63-179908 A
Patent Document 2: JP 2008-156516 A

SUMMARY OF THE INVENTION

Problem to be Solved by the Invention

An object of the present invention is to provide a novel process for preparing a branched conjugated diene polymer being useful as a rubber component for a tire for improvement of processability.

A branched conjugated diene polymer which is a target product relating to the preparation process of the present invention (hereinafter referred to simply as "the target product according to the present invention", "the branched conjugated diene polymer according to the present invention", "the branched conjugated diene polymer", or the like) is useful as a component for a rubber composition for a tire for improvement of processability, and is useful for preparation of a rubber composition for a tire comprising the branched conjugated diene polymer, particularly a rubber composition for a tire enhancing both of abrasion resistance and grip performance to a high level and exhibiting excellent processability, and for production of a pneumatic tire produced using the rubber composition for a tire. An object of the present invention is to provide such a rubber composition for a tire and a pneumatic tire.

In the branched conjugated diene polymer according to the present invention, a branched conjugated diene copolymer prepared by copolymerizing a branched conjugated diene compound (1) with a conjugated diene compound (2) and/or a vinyl compound (3) is a novel compound, and an object of the present invention is also to provide such a novel branched conjugated diene copolymer.

Means to Solve the Problem

The present invention relates to a process for preparing a branched conjugated diene polymer comprising:
homopolymerizing a branched conjugated diene compound monomer represented by the general formula (1):

(1)

wherein $R^1$ is an aliphatic hydrocarbon having 6 to 11 carbon atoms, or,
copolymerizing the branched conjugated diene compound (1) monomer with a conjugated diene compound monomer represented by the general formula (2):

(2)

wherein $R^2$ and $R^3$ are the same or different and each is a hydrogen atom, an aliphatic hydrocarbon group having 1 to 3 carbon atoms or a halogen atom, and/or
a vinyl compound monomer represented by the general formula (3):

(3)

wherein $R^4$ is a hydrogen atom, an aliphatic hydrocarbon group having 1 to 3 carbon atoms, an alicyclic hydrocarbon group having 3 to 8 carbon atoms, or an aromatic hydrocarbon group having 6 to 10 carbon atoms (here, in the branched conjugated diene polymer, a polymerization ratio (l) of the branched conjugated diene compound (1) monomer is 1 to 100% by weight, a polymerization ratio (m) of the conjugated diene compound (2) monomer is 99 to 0% by weight, and a polymerization ratio (n) of the vinyl compound (3) monomer is 99 to 0% by weight),
wherein the polymerization comprises a step of adding monomer solution successively into catalyst solution.

It is preferable that the successive addition is to add monomer solution into catalyst solution dropwise.

It is preferable that the catalyst is one or more of organolithium compounds or one or more selected from the group consisting of lanthanoid compounds, titanium compounds, cobalt compounds and nickel compounds.

It is preferable that the polymerization ratio (l) of the branched conjugated diene compound (1) monomer is 1 to 99% by weight.

It is preferable that the conjugated diene compound (2) is 1,3-butadiene and/or isoprene.

It is preferable that the vinyl compound (3) is one or more selected from the group consisting of styrene, $\alpha$-methylstyrene, $\alpha$-vinylnaphthalene and $\beta$-vinylnaphthalene.

Further, the present invention relates to a rubber composition comprising the branched conjugated diene polymer prepared by the above-mentioned preparation process.

Furthermore, the present invention relates to a pneumatic tire produced using the above-mentioned rubber composition.

Effects of the Invention

Since in the preparation process of the present invention monomer solutions are added to a catalyst solution successively, a monomer concentration in the polymerization system can be controlled by an amount of monomers to be added (or an adding rate) in the presence of catalyst in an amount being sufficient for advancing the reaction. Therefore, not only the monomer concentration can be always kept within a proper range from the viewpoint of a reaction rate and a reaction temperature, but also abrupt increase in the reaction temperature due to run-away of the reaction can be prevented and generation of heat of reaction can be controlled to be within a proper range. Thus, according to the preparation process of the present invention, since the reaction temperature does not increase excessively, a normal pressure type reaction vessel which is used for usual chemical reaction can be used, and in addition, there is no need to use special equipment such as pressure resistant equipment for transferring materials which withstands an inner pressure and cooling equipment for controlling the reaction temperature, which is advantageous from the viewpoint of cost. Further, according to the preparation process of the present invention, there can be obtained an advantage that since the polymerization reaction advances efficiently, the polymerization can be completed in a short period of time compared with conventional polymerization reaction in which monomers and catalyst are mixed at once.

The branched conjugated diene polymer of the present invention is useful as a component of a rubber composition for a tire for improvement of processability, and by the use of the branched conjugated diene polymer, a rubber composition for a tire which enhances both of abrasion resistance and grip performance to a high level and has excellent processability can be obtained. Namely, in order to improve abrasion resistance and grip performance of a tire, a method of increasing a weight-average molecular weight (Mw) of a polymer to be used as a rubber component (Mw is, for example, 250,000 or more, 500,000 or more, or 1,000,000 or more) can be considered. In this case, as Mw increases, a Mooney viscosity of the polymer also increases and processability is lowered. However, since the branched conjugated diene polymer of the present invention has decreased Mooney viscosity compared with a polymer having the same Mw, by using it as a component for a rubber composition for a tire, it is possible to provide a rubber composition for a tire tread having decreased Mooney viscosity, being excellent in processability and having improved abrasion resistance and grip performance.

EMBODIMENT FOR CARRYING OUT THE INVENTION

<Target Product of the Present Invention>

The branched conjugated diene polymer of the present invention means a polymer obtained by homopolymerizing the branched conjugated diene compound (1), or a copolymer obtained by copolymerizing the branched conjugated diene compound (1) with the conjugated diene compound (2) and/or the vinyl compound (3).

The weight-average molecular weight (Mw) of the branched conjugated diene polymer of the present invention is not limited particularly as long as it is 3,000 or more, and is preferably 250,000 or more, more preferably 500,000 or more, further preferably 1,000,000 or more. This is because when Mw is less than 3,000, there is a tendency that the polymer becomes a liquid polymer having high fluidity, and when Mw is less than 250,000, there is a tendency that it does not cause a problem of deterioration of processability. On the other hand, Mw is not limited as long as it is 3,000,000 or less, and is preferably 2,000,000 or less. When Mw is more than 3,000,000, there is a tendency that the polymer is in a solid form having no rubber elasticity.

The number-average molecular weight (Mn) of the branched conjugated diene copolymer is preferably 3,000 or more, more preferably 250,000 or more. This is because when Mn is less than 3,000, there is a tendency that it does not cause any problem of increase in hardness of the rubber composition and deterioration of processability. On the other hand, Mn is preferably 3,000,000 or less, more preferably 2,000,000 or less. When Mn is more than 3,000,000, there is a tendency that the polymer is in a solid form having no rubber elasticity.

In the branched conjugated diene polymer, a preferable range of Mw/Mn is 20.0 or less, more preferably 10.0 or less. When Mw/Mn is more than 20.0, there is a tendency that it does not cause a problem of deterioration of processability. On the other hand, a lower limit of the Mw/Mn is not limited particularly, and even when it is 1.0 or more, no problem arises.

The glass transition temperature (Tg) of the branched conjugated diene polymer is usually within a range of $-110°$ C. to $110°$ C. For example, Tg of the branched conjugated diene copolymer containing a relatively large amount of high-cis butadiene prepared using a transition-metal catalyst tends to become lower as the amount of the high-cis butadiene is, increased, and Tg of the branched conjugated diene polymer containing a relatively large amount of styrene prepared using an anionic polymerization catalyst tends to become higher as the amount of the styrene is increased. In the branched conjugated diene polymer, the branched conjugated diene polymer containing a large amount of high-cis butadiene and the branched conjugated diene polymer containing a large amount of styrene exhibit improvement of processability only by blending and copolymerizing a small amount of the branched conjugated diene compound (1). However, in most cases, Tg hardly varies by blending of the branched conjugated diene compound (1).

A Mooney viscosity $ML_{1+4}$ ($130°$ C.) of the branched conjugated diene polymer is not limited particularly as long as it is lower compared with a polymer which has the same molecular weight and in which the branched conjugated diene compound (1) is replaced by the conjugated diene compound (2) since an effect of improving processability can be exhibited. Generally the Mooney viscosity is preferably 25 or more, more preferably 30 or more. When the Mooney viscosity is less than 25, the polymer tends to have fluidity. On the other hand, the Mooney viscosity is preferably 160 or less, more preferably 150 or less, further preferably 100 or less, further preferably 60 or less. If the Mooney viscosity exceeds 160, there is a tendency that a large amount of a softening agent or processing aid is necessary at the time of processing.

In the branched conjugated diene polymer, polymerization ratios of the branched conjugated diene compound (1), the conjugated diene compound (2), and the vinyl compound (3) which are monomers are described.

((l), (m) and (n) in the Branched Conjugated Diene Polymer)

The polymerization ratio (l) of the branched conjugated diene compound (1) is not limited particularly as long as it is 1 to 100% by weight. The polymerization ratio is preferably 2.5% by weight or more, further preferably 5% by weight or more. If the polymerization ratio is less than 1% by weight, there is a tendency that a sufficient effect of improving processability by blending the branched conjugated diene compound (1) cannot be obtained. On the other hand, the polymerization ratio is 99% by weight or less, preferably 75% by weight or less, more preferably 60% by weight or less, further preferably 50% by weight or less, further preferably 15% by weight or less. This is because when the polymerization ratio is more than 99% by weight, there is a case where the polymer becomes a polymer having fluidity, and when the compound is blended in a polymerization ratio of as much as 15% by weight, there is a tendency that a sufficient effect resulting from the blending of the branched conjugated diene compound (1) for improvement of processability can be exhibited.

The branched conjugated diene polymer of the present invention can include the conjugated diene compound (2) and/or the vinyl compound (3).

In the branched conjugated diene copolymer, the preferable range of the polymerization ratio (m) of the conjugated diene compound (2) is 1% by weight or more, more preferably 50% by weight or more. If "m" is less than 1% by weight, there is a case where the copolymer becomes a polymer having fluidity. On the other hand, the polymerization ratio is 99% by weight or less, more preferably 80% by weight or less, further preferably 72.5% by weight or less, further preferably 55% by weight or less. If "m" is more than 99% by weight, there is a tendency that an effect of copolymerizing the branched conjugated diene compound (1) for improving processability is decreased.

The preferable range of the polymerization ratio (n) of the vinyl compound (3) is 1% by weight or more, preferably 10% by weight or more, more preferably 25% by weight or more, further preferably 40% by weight or more. If "n" is less than 1% by weight, there is a tendency that the copolymer tends to be a polymer having fluidity, and if "n" is less than 10% by weight, there is a tendency that a hardness of the rubber is not so high as to raise a concern on processability and an effect of copolymerizing the branched conjugated diene compound (1) for improving processability is decreased. If "n" is 25% by weight or more, it is preferable because there is a tendency that the ratio contributes to improving grip performance of the rubber and, in addition, an effect of improving processability by blending the branched conjugated diene compound (1) is exhibited significantly since there arises a problem that processability of the copolymer is deteriorated. Such a tendency is seen further significantly in the case of "n" being 40% by weight or more. The polymerization ratio is 99% by weight or less, preferably 97.5% by weight or less, more preferably 95% by weight or less, further preferably 80% by weight or less, more preferably 60% by weight or less. If "n" is more than 99% by weight, there is a tendency that the copolymer becomes not in the form of rubber but in the form of resin and an effect resulting from copolymerization of the branched conjugated diene compound (1) is decreased.

In the branched conjugated diene polymer, the total of the polymerization ratios "l" of the branched conjugated diene compound (1), "m" of the conjugated diene compound (2), and "n" of the vinyl compound (3) is 100% by weight. Therefore, for example, in the case where the branched conjugated diene polymer is a copolymer comprising three kinds of monomers, i.e., the branched conjugated diene compound (1), the conjugated diene compound (2), and the vinyl compound (3), when the lower limit of any one of them is selected from the above-mentioned preferable range, allowable ranges of the upper limits of the other two are determined accordingly. Also, when the lower limits of any two of them are selected from the above-mentioned preferable ranges, the upper limit of the other one is determined accordingly. Similarly, with respect to the polymerization ratios "l", "m" and "n", when the upper limit of any one of them is selected from the above-mentioned preferable range, allowable ranges of the lower limits of the other two are determined accordingly. Also, when the upper limits of any two of them are selected from the above-mentioned preferable ranges, the lower limit of the other one is determined accordingly.

Further, in the case where the branched conjugated diene polymer is a copolymer comprising two kinds of monomers, i.e., the branched conjugated diene compound (1) and the conjugated diene compound (2) or the vinyl compound (3), when the lower limit or the upper limit of one of them is selected from the above-mentioned preferable range, allowable range of the upper limit or the lower limit of the other one is determined accordingly.

((l), (m) and (n) in the Case of the Branched Conjugated Diene Copolymer Comprising Three Kinds of Monomers, i.e., the Branched Conjugated Diene Compound (1), the Conjugated Diene Compound (2), and the Vinyl Compound (3))

The copolymerization ratio (l) of the branched conjugated diene compound (1) is not limited particularly as long as it is 1 to 99% by weight. The copolymerization ratio is preferably 2.5% by weight or more, further preferably 5% by weight or more. If the copolymerization ratio is less than 1% by weight, there is a tendency that a sufficient effect of improving processability by blending the branched conjugated diene compound (1) cannot be obtained. On the other hand, the copolymerization ratio is preferably less than 75% by weight, more preferably less than 60% by weight, further preferably less than 50% by weight, further preferably less than 15% by weight. This is because when the copolymerization ratio is more than 99% by weight, there is a case where the copolymer tends to be a polymer having fluidity, and when the compound is blended in a copolymerization ratio of as much as 15% by weight, there is a tendency that a sufficient effect resulting from the blending of the branched conjugated diene compound (1) for improvement of processability can be exhibited.

The branched conjugated diene copolymer includes both of the conjugated diene compound (2) and the vinyl compound (3).

In the branched conjugated diene copolymer, the lower limit of the copolymerization ratio (m) of the conjugated diene compound (2) is more than 0% by weight and the preferable range of the copolymerization ratio is 1% by weight or more, more preferably 50% by weight or more. If "m" is less than 1% by weight, the copolymer tends to be a polymer having fluidity. On the other hand, the copolymerization ratio is less than 99% by weight, more preferably less than 80% by weight, further preferably less than 72.5% by weight, further preferably less than 55% by weight. If "m" is 99% by weight or more, there is a tendency that an effect of blending the branched conjugated diene compound (1) for improving processability is decreased.

The lower limit of the copolymerization ratio (n) of the vinyl compound (3) is more than 0% by weight and the preferable range of the copolymerization ratio is 10% by weight or more, more preferably 25% by weight or more, further preferably 40% by weight or more. If "n" is less than 10% by weight, there is a tendency that a hardness of the rubber is not so high as to raise a concern on processability and an effect of copolymerizing the branched conjugated diene compound (1) for improving processability is decreased. If "n" is 25% by weight or more, it is preferable because there is a tendency that the ratio contributes to improving grip performance of the rubber and, in addition, an effect of improving processability by blending the branched conjugated diene compound (1) is exhibited significantly since there arises a problem that processability of the copolymer is deteriorated. Such a tendency is seen further significantly in the case of "n" being 40% by weight or more. The copolymerization ratio is less than 99% by weight, preferably less than 97.5% by weight, more preferably less than 95% by weight, further preferably less than 80% by weight, more preferably less than 60% by weight. If "n" is 99% by weight or more, there is a tendency that the copolymer becomes not in the form of rubber but in the form of resin and an effect resulting from blending the branched conjugated diene compound (1) is decreased.

In the branched conjugated diene copolymer, since the total of the copolymerization ratios "l" of the branched conjugated diene compound (1), "m" of the conjugated diene compound (2) and "n" of the vinyl compound (3) is 100% by weight, when the lower limit of any one of them is selected from the above-mentioned preferable range, allowable ranges of the upper limits of the other two are determined accordingly. Also, when the lower limits of any two of them are selected from the above-mentioned preferable ranges, the upper limit of the other one is determined accordingly. Similarly, with respect to the copolymerization ratios "l", "m" and "n", when the upper limit of any one of them is selected from the above-mentioned preferable range, allowable ranges of the lower limits of the other two are determined accordingly. Also, when the upper limits of any two of them are selected from the above-mentioned preferable ranges, the lower limit of the other one is determined accordingly.

<Branched Conjugated Diene Compound (1)>

In the branched conjugated diene compound (1), examples of the aliphatic hydrocarbon group having 6 to 11 carbon atoms are those having a normal structure such as hexyl, heptyl, octyl, nonyl, decyl and undecyl, isomers and/or unsaturated forms thereof, and derivatives thereof (for example, halides, hydroxides, and the like). Among these, particularly preferred examples are 4-methyl-3-pentenyl group, 4,8-dimethyl-nona-3,7-dienyl group, and the like, and derivatives thereof.

Examples of the branched conjugated diene compound (1) are myrcene, farnesene, and the like.

In the present invention, "myrcene" includes α-myrcene (2-methyl-6-methyleneocta-1,7-diene) and β-myrcene, and among these, β-myrcene (7-methyl-3-methyleneocta-1,6-diene) having the following structure is preferred.

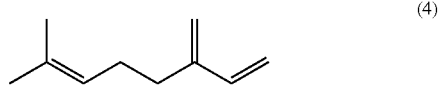

(4)

On the other hand, "farnesene" includes any isomers such as α-farnesene ((3E,7E)-3,7,11-trimethyl-1,3,6,10-dodecatetraene) and β-farnesene, and among these, (E)-β-farnesene (7,11-dimethyl-3-methylene-1,6,10-dodecatriene) having the following structure is preferred.

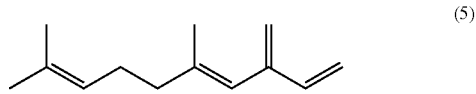

(5)

The branched conjugated diene compounds (1) can be used alone or can be used in combination of two or more thereof.

<Conjugated Diene Compound (2)>

In the conjugated diene compound (2), examples of the aliphatic hydrocarbon group having 1 to 3 carbon atoms are methyl, ethyl, n-propyl, isopropyl, and the like, and among these, methyl is preferred. Examples of the halogen atom are fluorine, chlorine, bromine and iodine, and among these, chlorine is preferred.

Each of $R^2$ or $R^3$ of the conjugated diene compound (2) is independently preferably a hydrogen atom, methyl, ethyl, n-propyl or isopropyl, and a hydrogen atom or methyl is more preferred. Examples of the conjugated diene compound (2) are 1,3-butadiene, isoprene, 2,3-dimethyl-1,3-butadiene, and the like, and among these, 1,3-butadiene and isoprene are preferred.

The conjugated diene compounds (2) can be used alone or can be used in combination of two or more thereof.

<Vinyl Compound (3)>

In the vinyl compound (3), examples of the aliphatic hydrocarbon group having 1 to 3 carbon atoms are methyl, ethyl, n-propyl, isopropyl, and the like, and among these, methyl is preferred. Examples of the alicyclic hydrocarbon group having 3 to 8 carbon atoms are cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, cyclooctenyl, and the like, and among these, cyclopropyl and cyclobutyl are preferred. Examples of the aromatic hydrocarbon group having 6 to 10 carbon atoms are phenyl, benzyl, phenethyl, tolyl, xylyl, naphthyl, and the like. The substitution position of methyl on the benzene ring of tolyl includes any of ortho, meta and para positions, and the substitution positions of methyl in xylyl also include any of optional substitution positions. Among these groups, preferred are phenyl, tolyl and naphthyl. Examples of the preferred vinyl compound (3) are styrene, α-methylstyrene, α-vinylnaphthalene and β-vinylnaphthalene.

The vinyl compounds (3) can be used alone or can be used in combination of two or more thereof.

<Preparation Process>

In the process for preparing the branched conjugated diene polymer according to the present invention, only the branched conjugated diene compound (1) is polymerized, or the branched conjugated diene compound (1) is copolymerized with the conjugated diene compound (2) and/or the vinyl compound (3). In such polymerization, an order of polymerization of monomers is not limited particularly, and for example, all the monomers may be subjected to random copolymerization simultaneously, or after previously polymerizing specific monomer or monomers (for example, only the branched conjugated diene compound (1) monomer, only the conjugated diene compound (2) monomer, only the vinyl compound (3) monomer, or any of monomers arbitrarily selected from these), the remaining monomers or monomer may be copolymerized, or each monomer may be previously polymerized respectively, and then subjected to block copolymerization. Therefore, the branched conjugated diene copolymer according to the present invention includes any of target products obtained from these polymerization reactions.

The preparation process of the present invention comprises a step of adding monomer solution successively into catalyst solution for polymerization.

(Successive Addition)

In the present invention, the successive addition means the addition of monomer solution(s) one after another in series into a catalyst solution, and the method of addition is not limited particularly. Therefore, for example, the successive addition includes various methods such as a method of dividing the total amount of the monomer solution(s) into, for example, three portions, four portions or the like and subjecting each of the divided portions to an addition at a time or a dropwise addition, or to any combination thereof. Among these, a method of adding the monomer solution(s) dropwise at a given adding rate is preferred from the viewpoint of preparation of a uniform target product, easy operation and easy control of a polymerization reaction temperature.

(Reaction Temperature)

The polymerization reaction temperature can be within a proper range by controlling a maximum temperature during the polymerization reaction to be within a given range considering an initial temperature before the polymerization reaction starts as an index. The maximum temperature varies depending on an initial temperature before the polymerization reaction starts, kind, amount and concentration of a catalyst to be used, kinds, amounts and concentrations of monomers to be used, an adding rate of the monomers, and the like, and the proper maximum temperature is a temperature which only differs from the initial temperature by about 10° C. or less. When the difference between the maximum temperature and the initial temperature is more than 10° C., there is a tendency that elimination of heat with conventional production equipment is difficult and special cooling equipment is required. The initial temperature of the polymerization reaction is usually 5° C. to 45° C.

Adjusting the difference between the maximum temperature and the initial temperature to be within a range of about 10° C. or less can be carried out, for example, by controlling the adding rate of monomers per a unit time to be a predetermined value or less. For example, in the case of adding monomer solutions dropwise at a given rate, the difference between the maximum temperature and the initial temperature can be adjusted to be within a range of about 10° C. or less by controlling the adding rate thereof to a predetermined value or less. In the present invention, preferable example of the adding rate of the monomer solutions is to add the monomer solutions dropwise over two hours or more under the reaction conditions of Examples 1 to 8. It is easy for a person skilled in the art to control the difference between the maximum temperature and the initial temperature to be within a range of about 10° C. or less by adjusting various factors in an actual polymerization reaction by referring to the above-mentioned explanations without conducting excessive experiment.

(Polymerization Reaction)

The polymerization reaction can be carried out by any of usual methods, and examples of the methods are anionic polymerization, coordination polymerization, and the like.

<Anionic Polymerization>

The anionic polymerization is a polymerization reaction using an anionic initiator as a catalyst, and can be carried out in a proper solvent. As an anionic initiator, any of usual ones can be used suitably, and examples of such an anionic initiator are organolithium compounds having a general formula RLix (R is an aliphatic, aromatic or alicyclic group having one or more carbon atoms, x is an integer of 1 to 20). Examples of proper organolithium compounds are methyllithium, ethyllithium, n-butyllithium, sec-butyllithium, tert-butyllithium, phenyllithium and naphthyllithium. Preferred organolithium compounds are n-butyllithium and sec-butyllithium. Anionic initiators can be used alone or can be used in a mixture of two or more thereof. An amount of a polymerization initiator for anionic polymerization is not limited particularly, and it is preferable to use, for example, in an amount of preferably from about 0.05 mmol to 35 mmol, more preferably from about 0.05 mmol to 0.2 mmol per 100 g of all the monomers to be subjected to polymerization. If the amount of the polymerization initiator is less than 0.05 mmol, there is a tendency that the copolymer becomes not in the form of rubber but in the form of resin, and if the amount of the polymerization initiator is more than 35 mmol, there is a tendency that the copolymer is soft and an effect produced by copolymerizing the branched conjugated diene compound (1) for processability is decreased.

As a solvent to be used for the anionic polymerization, any of solvents can be used suitably as long as they neither inactivate the anionic initiator nor stop the polymerization reaction, and any of polar solvents and nonpolar solvents can be used. Examples of polar solvents are ether solvents such as tetrahydrofuran, and examples of nonpolar solvents are chain hydrocarbons such as hexane, heptane, octane and pentane, cyclic hydrocarbons such as cyclohexane, aromatic hydrocarbons such as benzene, toluene and xylene, and the like. These solvents can be used alone or can be used in a mixture of two or more thereof.

It is further preferable to carry out the anionic polymerization in the presence of a polar compound. Examples of polar compounds are dimethyl ether, diethyl ether, ethyl methyl ether, ethyl propyl ether, tetrahydrofuran, dioxane, diphenyl ether, tripropylamine, tributylamine, trimethylamine, triethylamine, N,N,N',N'-tetramethylethylenediamine (TMEDA), and the like. Polar compounds can be used alone or can be used in a mixture of two or more thereof. The polar compounds relate to the micro structure of butadiene portion and are useful for reducing the content of 1,2-structure. The amount of polar compound varies depending on kind thereof and the polymerization conditions, and a molar ratio thereof to the anionic initiator (polar compound/anionic initiator) is preferably 0.1 or more. When the molar ratio of the polar compound to the anionic initiator (polar compound/anionic initiator) is less than 0.1, there is a tendency that an effect of using the polar compound for controlling the micro structure is not sufficient.

The reaction time of the anionic polymerization varies depending on charging amounts, reaction temperature and other conditions, and in the preparation process of the present invention where the monomer solutions are added successively to the catalyst solution, since the polymerization reaction advances efficiently, the polymerization can be completed in a short period of time compared with conventional polymerization reaction where monomer solutions and a catalyst are mixed at once.

The above-mentioned anionic polymerization can be terminated by adding a reaction inhibitor to be usually used in this field. Examples of the reaction inhibitor are polar solvents having an active proton such as alcohols, for example, methanol, ethanol and isopropanol or acetic acid, a mixture thereof, or a mixture of the polar solvents with nonpolar solvents such as hexane and cyclohexane. A sufficient amount of reaction inhibitor is usually an equimolar amount or two-fold molar amount to the anionic initiator.

After the polymerization reaction, the branched conjugated diene copolymer can be separated from the polymerization solution easily by removing the solvent by a usual method or by pouring the polymerization solution in an alcohol of an amount equal to or more than the amount of polymerization solution and precipitating the branched conjugated diene copolymer.

<Coordination Polymerization>

The coordination polymerization is a polymerization reaction using a coordination polymerization initiator instead of the anionic initiator in the anionic polymerization, and can be carried out in a proper solvent. Any of usual coordination polymerization initiators can be suitably used, and examples thereof are catalysts that are transition metal-containing compounds such as lanthanoid compounds, titanium compounds, cobalt compounds and nickel compounds. In addition, if desired, an aluminum compound or a boron compound can be used as a co-catalyst.

The lanthanoid compound is not limited particularly as long as it contains any of elements (lanthanoids) of atomic numbers 57 to 71, and among these lanthanoids, neodymium is preferred particularly. Examples of the lanthanoid compounds are carboxylates, β-diketone complexes, alkoxides, phosphates, phosphites, halides and the like of these elements. Among these, from the viewpoint of easy handling, carboxylates, alkoxides, and β-diketone complexes are preferred. Examples of the titanium compounds are titanium-containing compounds having a cyclopentadienyl group, an indenyl group, a substituted cyclopentadienyl group, or a substituted indenyl group and also having 3 substituents selected from a halogen, an alkoxysilyl group and an alkyl group, and preferred are compounds having one alkoxysilyl group from the viewpoint of catalytic activity. Examples of the cobalt compounds are halides, carboxylates, β-diketone complexes, organic base complexes, organic phosphine complexes, and the like of cobalt. Examples of the nickel compounds are halides, carboxylates, β-diketone complexes, organic base complexes, and the like of nickel. Catalysts to be used as a coordination polymerization initiator can be used alone or can be used in combination of two or more thereof.

Examples of the aluminum compounds to be used as a co-catalyst are organic aluminoxanes, halogenated organo-aluminum compounds, organoaluminum compounds, hydrogenated organoaluminum compounds, and the like. Examples of the organic aluminoxanes are alkyl aluminoxanes (such as methyl aluminoxane, ethyl aluminoxane, propyl aluminoxane, butyl aluminoxane, isobutyl aluminoxane, octyl aluminoxane, and hexyl aluminoxane); examples of the halogenated organoaluminum compounds are halogenated alkyl aluminum compounds (such as dimethyl aluminum chloride, diethyl aluminum chloride, methyl aluminum dichloride, and ethyl aluminum dichloride); examples of the organoaluminum compounds are alkyl aluminum compounds (such as trimethylaluminum, triethylaluminum, triisopropylaluminum, and triisobutylaluminum); and examples of the hydrogenated organoaluminum compounds are hydrogenated alkyl aluminum compounds (such as diethylaluminum hydride, and diisobutylaluminum hydride). Examples of the boron compounds are compounds having anion species such as tetraphenylborate, tetrakis (pentafluorophenyl)borate, and (3,5-bistrifluoromethylphenyl)borate. These co-catalysts can be used alone or can be used in combination of two or more thereof.

In the coordination polymerization, the solvents and the polar compounds explained in the anionic polymerization can be used similarly. In addition, the reaction time and the reaction temperature are the same as those explained in the anionic polymerization. Termination of the polymerization reaction and separation of the branched conjugated diene copolymer can also be carried out in the same manner as in the anionic polymerization.

(Control of Mw, Mn, Tg, Mooney Viscosity)

The weight-average molecular weight (Mw) of the branched conjugated diene polymer can be controlled by adjusting the amounts of monomers, to the catalyst, to be charged at the polymerization, i.e., the branched conjugated diene compound (1), the conjugated diene compound (2) and the vinyl compound (3). For example, by increasing the ratio of all the monomers to the catalyst, Mw can be increased, and by decreasing the ratio, Mw can be decreased. The same is applied also for the number-average molecular weight (Mn) of the branched conjugated diene copolymer.

Tg of the branched conjugated diene copolymer can be controlled by adjusting the charging ratios of the conjugated diene compound (2) and the vinyl compound (3) to be charged at the polymerization. For example, by increasing the charging ratio of the vinyl compound (3), Tg can be made high, and on the contrary, by decreasing the charging ratio of the vinyl compound (3), Tg can be made low.

The Mooney viscosity of the branched conjugated diene copolymer can be controlled by adjusting the charging amount of the branched conjugated diene monomer to be charged at the polymerization. For example, by decreasing the charging amount of branched conjugated diene monomer, the Mooney viscosity is increased, and on the contrary, by increasing the charging amount of branched conjugated diene monomer, the Mooney viscosity is decreased.

A rubber composition for a tire can be prepared by adequately blending other components to be used in the field of rubber industry to the thus obtained branched conjugated diene copolymer of the present invention.

Examples of the components to be blended to the rubber composition of the present invention are rubber components other than the branched conjugated diene copolymer, a filler, a silane coupling agent, and the like. In addition to the above-mentioned components, compounding agents which have been used in the field of rubber industry, for example, other reinforcing filler, an antioxidant, an oil, a wax, a vulcanizing agent such as sulfur, a vulcanization accelerator, a vulcanization aid, and the like can be properly blended to the rubber composition of the present invention.

The thus obtained rubber composition of the present invention can be used as various parts of a tire, and can be suitably used, in particular, for a tire tread since abrasion resistance and grip performance can be improved to a high level.

The rubber composition of the present invention can be used for production of tires and can be formed into tires by a usual method. Namely, a mixture obtained by optionally blending the above-mentioned components according to necessity is subjected to kneading, extrusion processing to a shape of each part of a tire at an unvulcanized stage, and molding on a tire molding machine by a usual method, thus forming an unvulcanized tire. A tire can be obtained by heating and compressing this unvulcanized tire in a vulcanizer, and by introducing air in the tire, a pneumatic tire can be obtained.

Herein, Mw and Mn are measured using a gel permeation chromatograph (GPC), and are converted based on standard polystyrene.

A glass transition temperature (Tg) is measured with a differential scanning calorimeter (DSC).

A Mooney viscosity is measured in accordance with JIS K 6300.

A range simply indicated by "1 to 99% by weight" is construed so as to include the figures at both ends.

EXAMPLE

The present invention is explained by means of Examples, but is not limited to the Examples.

Various chemicals used in Examples and Comparative Examples are collectively shown below. The various chemicals were subjected to purification according to necessity by a usual method.
Hexane: Anhydrous hexane available from Kanto Chemical Industry Co., Ltd. (special grade)
Isopropanol: Isopropanol available from Kanto Chemical Industry Co., Ltd. (special grade)
THF: Tetrahydrofuran available from Kanto Chemical Industry Co., Ltd. (special grade)
Myrcene: β-Myrcene available from Wako Pure Chemical Industries, Ltd. (reagent)
Farnesene: (E)-β-Farnesene available from Nippon Terpene Chemicals, Inc. (reagent)
Isoprene: Isoprene available from Wako Pure Chemical Industries, Ltd. (reagent)
Butadiene: 1,3-Butadiene available from Takachiho Chemical Industrial Co., Ltd. (reagent)
Styrene: Styrene available from Wako Pure Chemical Industries, Ltd. (reagent)
1. Synthesis of Myrcene Copolymers Example 1 (Synthesis of Polymer 1)

Into a 1-liter glass vessel having been subjected to drying and replacement with nitrogen, 500 ml of hexane, 46 g of THF and 40 mmol of n-butyllithium (n-BuLi) were added. To the mixture, while adding a mixture of 100 ml of hexane, 150 g of myrcene and 125 g of styrene dropwise over two hours with stirring, polymerization reaction was carried out. After completion of the dropwise addition, 10 ml of 2M isopropanol/hexane solution was added dropwise to terminate the polymerization reaction. The reaction solution was subjected to air-drying overnight and then drying under reduced pressure for two days. Thus, 275 g of Polymer 1 was obtained. The degree of polymerization (percentage of dry weight/charged amount) was nearly 100%. The initial reaction temperature of the polymerization reaction was the same as the outside temperature of 25° C., and the maximum reaction temperature during the polymerization reaction was 34° C.

Example 2 (Synthesis of Polymer 2)

Processing was carried out in the same manner as in Example 1 except that 69 g of myrcene and 81 g of isoprene were used instead of 150 g of myrcene, to obtain 275 g of Polymer 2. The degree of polymerization was nearly 100%. The initial reaction temperature of the polymerization reaction was the same as the outside temperature of 25° C., and the maximum reaction temperature during the polymerization reaction was 34° C.

Example 3 (Synthesis of Polymer 3)

Processing was carried out in the same manner as in Example 1 except that 69 g of myrcene and 81 g of butadiene were used instead of 150 g of myrcene, to obtain 275 g of Polymer 3. The degree of polymerization was nearly 100%. The initial reaction temperature of the polymerization reaction was the same as the outside temperature of 25° C., and the maximum reaction temperature during the polymerization reaction was 33° C.

Comparative Example 1 (Synthesis of Polymer I)

Into a 1-liter pressure resistant stainless steel vessel having been subjected to drying and replacement with nitrogen, 500 ml of hexane, 46 g of THF and 40 mmol of n-butyllithium (n-BuLi) were added. To the mixture, a mixture of 100 ml of hexane, 150 g of myrcene and 125 g of styrene was added at once, followed by stirring to carry out polymerization reaction. After five hours had elapsed, 10 ml of 2M isopropanol/hexane solution was added dropwise to terminate the polymerization reaction. The reaction solution was subjected to air-drying overnight and then drying under reduced pressure for two days. Thus, 275 g of Polymer I was obtained. The degree of polymerization was nearly 100%. The initial reaction temperature of the polymerization reaction was the same as the outside temperature of 25° C., and the maximum reaction temperature during the polymerization reaction was 58° C.

Comparative Example 2 (Synthesis of Polymer II)

Processing was carried out in the same manner as in Comparative Example 1 except that 69 g of myrcene and 81 g of isoprene were used instead of 150 g of myrcene, to obtain 275 g of Polymer II. The degree of polymerization was nearly 100%. The initial reaction temperature of the polymerization reaction was the same as the outside temperature of 25° C., and the maximum reaction temperature during the polymerization reaction was 59° C.

Comparative Example 3 (Synthesis of Polymer III)

Processing was carried out in the same manner as in Comparative Example 1 except that 69 g of myrcene and 81 g of butadiene were used instead of 150 g of myrcene, to obtain 275 g of Polymer III. The degree of polymerization was nearly 100%. The initial reaction temperature of the polymerization reaction was the same as the outside temperature of 25° C., and the maximum reaction temperature during the polymerization reaction was 59° C.

With respect to the obtained Polymers 1 to 3 and Polymers I to III, weight-average molecular weight Mw, number-average molecular weight Mn and a copolymerization ratio (1) were measured by the following methods. The results are shown in Table 1.

(Measurement of Weight-Average Molecular Weight Mw, Number-Average Molecular Weight Mn)

Mw and Mn were measured with an apparatus GPC-8000 Series available from TOSO CORPORATION and a differential refractometer as a detector, and were converted based on standard polystyrene.

(Copolymerization Ratio (1) of Branched Conjugated Diene Compound (1))

The copolymerization ratio (1) (% by weight) was measured by a usual method using a pyrolysis gas chromatography (PGC). Namely, a calibration curve of a purified branched conjugated diene compound (1) was prepared, and % by weight of the branched conjugated diene compound (1) in the copolymer was calculated using an area ratio of a pyrolyzate derived from the branched conjugated diene compound (1) which was obtained by PGC. In the pyrolysis chromatography, a system comprising a gas chromatograph mass spectrometer GCMS-QP5050A available from Shimadzu Corporation and a pyrolyzer JHP-330 available from Japan Analytical Industry Co., Ltd. was used.

and the use of a pressure resistant type vessel was required and a long reaction time was required.

2. Synthesis of Farnesene Copolymers

Example 4 (Synthesis of Polymer 4)

Processing was carried out in the same manner as in Example 1 except that 150 g of farnesene was used instead of 150 g of myrcene, to obtain 275 g of Polymer 4. The degree of polymerization was nearly 100%. The initial reaction temperature of the polymerization reaction was the same as the outside temperature of 25° C., and the maximum polymerization reaction temperature was 34° C.

Example 5 (Synthesis of Polymer 5)

Processing was carried out in the same manner as in Example 1 except that 69 g of farnesene and 81 g of isoprene were used instead of 150 g of myrcene, to obtain 275 g of Polymer 5. The degree of polymerization was nearly 100%. The initial reaction temperature of the polymerization reaction was the same as the outside temperature of 25° C., and the maximum polymerization reaction temperature was 34° C.

TABLE 1

|  | Example | | | Comparative Example | | |
| --- | --- | --- | --- | --- | --- | --- |
|  | 1 | 2 | 3 | 1 | 2 | 3 |
| Polymer | 1 | 2 | 3 | I | II | III |
| Reaction conditions | | | | | | |
| Branched conjugated diene compound (1) | | | | | | |
| Myrcene (% by weight) | 55 | 25 | 25 | 55 | 25 | 25 |
| Conjugated diene compound (2) | | | | | | |
| Isoprene (% by weight) |  | 30 |  |  | 30 |  |
| Butadiene (% by weight) |  |  | 30 |  |  | 30 |
| Vinyl compound (3) | | | | | | |
| Styrene (% by weight) | 45 | 45 | 45 | 45 | 45 | 45 |
| Polymerization reaction vessel | normal pressure type | normal pressure type | normal pressure type | pressure resistant type | pressure resistant type | pressure resistant type |
| Monomer adding time | 2 | 2 | 2 | — | — | — |
| Initial temperature (° C.) | 25 | 25 | 25 | 25 | 25 | 25 |
| Maximum temperature (° C.) | 34 | 34 | 33 | 58 | 59 | 59 |
| Total reaction time (hr) | 2 | 2 | 2 | 5 | 5 | 5 |
| Results | | | | | | |
| Temperature difference (between max and initial) | 9 | 9 | 8 | 33 | 34 | 34 |
| Yield (%) | 100 | 100 | 100 | 100 | 100 | 100 |
| Mw | 6231 | 5872 | 5642 | 6120 | 5791 | 5523 |
| Mn | 5664 | 5338 | 5129 | 5563 | 5263 | 5020 |
| Mw/Mn | 1.1 | 1.1 | 1.1 | 1.1 | 1.1 | 1.1 |
| Copolymerization ratio (1) (% by weight) | 55.0 | 25.0 | 25.0 | 55.0 | 25.0 | 25.0 |

As shown in Table 1, in the preparation process of the present invention of Examples 1 to 3, the difference between the initial reaction temperature and the maximum reaction temperature was decreased to be as low as 8° C.-9° C., and the reaction could be completed in a short period of time using a normal pressure type vessel. On the contrary, in the preparation process of Comparative Examples 1 to 3, the difference between the initial reaction temperature and the maximum reaction temperature reached to 33° C.-34° C., Example 6 (Synthesis of Polymer 6)

Processing was carried out in the same manner as in Example 1 except that 69 g of farnesene and 81 g of butadiene were used instead of 150 g of myrcene, to obtain 275 g of Polymer 6. The degree of polymerization was nearly 100%. The initial reaction temperature of the polymerization reaction was the same as the outside temperature of 25° C., and the maximum polymerization reaction temperature was 34° C.

Comparative Example 4 (Synthesis of Polymer IV)

Processing was carried out in the same manner as in Comparative Example 1 except that 150 g of farnesene was used instead of 150 g of myrcene, to obtain 275 g of Polymer IV. The degree of polymerization was nearly 100%. The initial reaction temperature of the polymerization reaction was the same as the outside temperature of 25° C., and the maximum polymerization reaction temperature was 59° C.

Comparative Example 5 (Synthesis of Polymer V)

Processing was carried out in the same manner as in Comparative Example 1 except that 69 g of farnesene and 81 g of isoprene were used instead of 150 g of myrcene, to obtain 275 g of Polymer V. The degree of polymerization was nearly 100%. The initial reaction temperature of the polymerization reaction was the same as the outside temperature of 25° C., and the maximum polymerization reaction temperature was 61° C.

Comparative Example 6 (Synthesis of Polymer VI)

Processing was carried out in the same manner as in Comparative Example 1 except that 69 g of farnesene and 81 g of butadiene were used instead of 150 g of myrcene, to obtain 275 g of Polymer VI. The degree of polymerization was nearly 100%. The initial reaction temperature of the polymerization reaction was the same as the outside temperature of 25° C., and the maximum polymerization reaction temperature was 59° C.

With respect to the obtained Polymers 4 to 6 and Polymers IV to VI, weight-average molecular weight Mw, number-average molecular weight Mn and a copolymerization ratio (1) were measured by the above-mentioned methods. The results are shown in Table 2.

As shown in Table 2, in the preparation process of the present invention of Examples 4 to 6, the difference between the initial reaction temperature and the maximum reaction temperature was decreased to be as low as 9° C., and the reaction could be completed in a short period of time using a normal pressure type vessel. On the contrary, in the preparation process of Comparative Examples 4 to 6, the difference between the initial reaction temperature and the maximum reaction temperature reached to 34° C.-36° C., and the use of a pressure resistant type vessel was required and a long reaction time was required.

3. Branched Conjugated Diene Homopolymer

Example 7 (Synthesis of Polymer 7)

Processing was carried out in the same manner as in Example 1 except that 275 g of myrcene was used instead of all the monomers, to obtain 275 g of Polymer 7. The degree of polymerization was nearly 100%. The initial reaction temperature of the polymerization reaction was the same as the outside temperature of 25° C., and the maximum polymerization reaction temperature was 34° C.

Example 8 (Synthesis of Polymer 8)

Processing was carried out in the same manner as in Example 1 except that 275 g of farnesene was used instead of all the monomers, to obtain 275 g of Polymer 8. The degree of polymerization was nearly 100%. The initial reaction temperature of the polymerization reaction was the same as the outside temperature of 25° C., and the maximum polymerization reaction temperature was 35° C.

Comparative Example 7 (Synthesis of Polymer VII)

Processing was carried out in the same manner as in Comparative Example 1 except that 275 g of myrcene was

TABLE 2

|  | Example | | | Comparative Example | | |
| --- | --- | --- | --- | --- | --- | --- |
|  | 4 | 5 | 6 | 4 | 5 | 6 |
| Polymer | 4 | 5 | 6 | IV | V | VI |
| Reaction conditions | | | | | | |
| Branched conjugated diene compound (1) | | | | | | |
| Farnesene (% by weight) | 55 | 25 | 25 | 55 | 25 | 25 |
| Conjugated diene compound (2) | | | | | | |
| Isoprene (% by weight) |  | 30 |  |  | 30 |  |
| Butadiene (% by weight) |  |  | 30 |  |  | 30 |
| Vinyl compound (3) | | | | | | |
| Styrene (% by weight) | 45 | 45 | 45 | 45 | 45 | 45 |
| Polymerization reaction vessel | normal pressure type | normal pressure type | normal pressure type | pressure resistant type | pressure resistant type | pressure resistant type |
| Monomer adding time | 2 | 2 | 2 | — | — | — |
| Initial temperature (° C.) | 25 | 25 | 25 | 25 | 25 | 25 |
| Maximum temperature (° C.) | 34 | 34 | 34 | 59 | 61 | 59 |
| Total reaction time (hr) | 2 | 2 | 2 | 5 | 5 | 5 |
| Results | | | | | | |
| Temperature difference (between max and initial) | 9 | 9 | 9 | 34 | 36 | 34 |
| Yield (%) | 100 | 100 | 100 | 100 | 100 | 100 |
| Mw | 6112 | 5901 | 5640 | 6166 | 5801 | 5546 |
| Mn | 5660 | 5398 | 5122 | 5593 | 5278 | 5043 |
| Mw/Mn | 1.1 | 1.1 | 1.1 | 1.1 | 1.1 | 1.1 |
| Copolymerization ratio (1) (% by weight) | 55.0 | 25.0 | 25.0 | 55.0 | 25.0 | 25.0 | used instead of all the monomers, to obtain 275 g of Polymer VII. The degree of polymerization was nearly 100%. The initial reaction temperature of the polymerization reaction was the same as the outside temperature of 25° C., and the maximum polymerization reaction temperature was 57° C.

Comparative Example 8 (Synthesis of Polymer VIII)

Processing was carried out in the same manner as in Comparative Example 1 except that 275 g of farnesene was used instead of all the monomers, to obtain 275 g of Polymer VIII. The degree of polymerization was nearly 100%. The initial reaction temperature of the polymerization reaction was the same as the outside temperature of 25° C., and the maximum polymerization reaction temperature was 58° C.

With respect to the obtained Polymers 7 to 8 and Polymers VII to VIII, weight-average molecular weight Mw, number-average molecular weight Mn and a copolymerization ratio (l) were measured by the above-mentioned methods. The results are shown in Table 3.

TABLE 3

|  | Example | | Comparative Example | |
|---|---|---|---|---|
|  | 7 | 8 | 7 | 8 |
| Polymer | 7 | 8 | VII | VIII |
| Reaction conditions | | | | |
| Branched conjugated diene compound (1) | | | | |
| Myrcene (% by weight) | 100 | | 100 | |
| Farnesene (% by weight) | | 100 | | 100 |
| Polymerization reaction vessel | normal pressure type | normal pressure type | pressure resistant type | pressure resistant type |
| Monomer adding time | 2 | 2 | — | — |
| Initial temperature (° C.) | 25 | 25 | 25 | 25 |
| Maximum temperature (° C.) | 34 | 35 | 57 | 58 |
| Total reaction time (hr) | 2 | 2 | 5 | 5 |
| Results | | | | |
| Temperature difference (between max and initial) | 9 | 10 | 32 | 33 |
| Yield (%) | 100 | 100 | 100 | 100 |
| Mw | 6102 | 6110 | 6201 | 6109 |
| Mn | 5670 | 5720 | 5714 | 5702 |
| Mw/Mn | 1.1 | 1.1 | 1.1 | 1.1 |
| Copolymerization ratio (l) (% by weight) | 100.0 | 100.0 | 100.0 | 100.0 |

As shown in Table 3, in the preparation process of the present invention of Examples 7 to 8, the difference between the initial reaction temperature and the maximum reaction temperature was decreased to be as low as 9° C.-10° C., and the reaction could be completed in a short period of time using a normal pressure type vessel. On the contrary, in the preparation process of Comparative Examples 7 to 8, the difference between the initial reaction temperature and the maximum reaction temperature reached to 32° C.-33° C., and the use of a pressure resistant type vessel was required and a long reaction time was required.

INDUSTRIAL APPLICABILITY

The present invention can provide a novel process for preparing the branched conjugated diene polymer being useful for improving processability as a rubber component for a tire. Also, the branched conjugated diene polymer which is a target product of the preparation process of the present invention is useful for improving processability as a rubber component for a tire. The present invention can provide a rubber composition for a tire comprising the branched conjugated diene polymer, in particular a rubber composition for a tire enhancing both of abrasion resistance and grip performance to a high level and exhibiting excellent processability, and a pneumatic tire prepared using the rubber composition for a tire.

The invention claimed is:

1. A process for preparing a branched conjugated diene polymer, comprising:
   polymerizing a branched conjugated diene compound monomer such that a branched conjugated diene polymer is obtained, the polymerizing comprising adding a monomer solution comprising the branched conjugated diene compound monomer and a chain hydrocarbon solvent into a catalyst solution by dropwise addition and controlling an adding rate of the monomer solution per a unit time such that an initial temperature of a polymerization reaction is in a range of 5° C. to 45° C. and that a temperature difference of a polymerization reaction temperature between the initial temperature and a maximum temperature is adjusted to be within a temperature range of a normal-pressure reaction vessel without controlling the polymerization reaction temperature by a cooling equipment,
   wherein the polymerizing comprises copolymerizing the branched conjugated diene compound monomer with at least one of a conjugated diene compound monomer and a vinyl compound monomer, the branched conjugated diene compound monomer is at least one of myrcene and farnesene, the conjugated diene compound monomer is at least one of 1,3-butadiene and isoprene, the vinyl compound monomer is styrene, the branched conjugated diene compound monomer is polymerized such that the branched conjugated diene polymer has a polymerization ratio (l) of the branched conjugated diene compound monomer in a range of 1 to 99% by weight, a polymerization ratio (m) of the conjugated diene compound monomer in a range of 99 to 0% by weight, and a polymerization ratio (n) of the vinyl compound monomer in a range of 99 to 0% by weight, the monomer solution comprises the branched conjugated diene compound monomer and at least one of the conjugated diene compound monomer and the vinyl compound monomer in the chain hydrocarbon solvent, the polymerizing comprises adding the monomer solution comprising the branched conjugated diene compound monomer and at least one of the conjugated diene compound monomer and the vinyl compound monomer in the chain hydrocarbon solvent into the catalyst solution, and the adding of the monomer solution comprising the branched conjugated diene compound monomer and at least one of the conjugated diene compound monomer and the vinyl compound monomer comprises controlling the adding rate per a unit time such that the temperature difference between the initial temperature and the maximum temperature is in a range of 10° C. or less during the polymerization reaction.

2. The process of claim 1, wherein the chain hydrocarbon solvent is hexane.

3. The process of claim 1, wherein the polymerizing comprises adding the monomer solution into the catalyst solution by the dropwise addition over a duration of two hours or more, and the polymerizing is random copolymerization which comprises copolymerizing the branched conjugated diene compound monomer with at least one of the conjugated diene compound monomer and the vinyl compound monomer.

4. The process of claim 1, wherein the catalyst solution comprises at least one catalyst selected from the group consisting of organolithium compounds or at least one catalyst selected from the group consisting of lanthanoid compounds, titanium compounds, cobalt compounds and nickel compounds.

5. The process of claim 1, wherein the polymerization ratio (l) of the branched conjugated diene compound monomer is 1 to 60% by weight.

6. The process of claim 4, wherein the polymerization ratio (l) of the branched conjugated diene compound monomer is 1 to 60% by weight.

7. The process of claim 1, wherein the normal-pressure reaction vessel is a glass vessel.

8. The process of claim 4, wherein the normal-pressure reaction vessel is a glass vessel.

9. The process of claim 1, wherein the branched conjugated diene compound monomer is farnesene.

10. The process of claim 4, wherein the branched conjugated diene compound monomer is farnesene.

11. The process of claim 7, wherein the branched conjugated diene compound monomer is farnesene.

12. The process of claim 1, wherein the branched conjugated diene compound monomer is polymerized such that the branched conjugated diene polymer has the polymerization ratio (l) of the branched conjugated diene compound monomer in a range of 1 to 60% by weight, the polymerization ratio (m) of the conjugated diene compound monomer in a range of 55 to 0% by weight, and the polymerization ratio (n) of the vinyl compound monomer in a range of 99 to 40% by weight.

13. The process of claim 4, wherein the chain hydrocarbon solvent is hexane.

14. The process of claim 5, wherein the chain hydrocarbon solvent is hexane.

15. The process of claim 6, wherein the chain hydrocarbon solvent is hexane.

16. The process of claim 7, wherein the chain hydrocarbon solvent is hexane.

17. The process of claim 8, wherein the chain hydrocarbon solvent is hexane.

18. The process of claim 1, wherein the polymerizing comprises adding the monomer solution into the catalyst solution by the dropwise addition over a duration of two hours or more.

19. The process of claim 18, wherein the chain hydrocarbon solvent is hexane.

20. The process of claim 18, wherein the catalyst solution comprises at least one catalyst selected from the group consisting of organolithium compounds or at least one catalyst selected from the group consisting of lanthanoid compounds, titanium compounds, cobalt compounds and nickel compounds.

* * * * *